United States Patent
Mima et al.

(10) Patent No.: US 11,586,444 B2
(45) Date of Patent: Feb. 21, 2023

(54) PROCESSOR AND PIPELINE PROCESSING METHOD FOR PROCESSING MULTIPLE THREADS INCLUDING WAIT INSTRUCTION PROCESSING

(71) Applicant: SANKEN ELECTRIC CO., LTD., Niiza (JP)

(72) Inventors: Kazuhiro Mima, Niiza (JP); Hitomi Shishido, Niiza (JP)

(73) Assignee: SANKEN ELECTRIC CO., LTD., Niiza (JP)

( * ) Notice: Subject to any disclaimer, the term of this patent is extended or adjusted under 35 U.S.C. 154(b) by 0 days.

(21) Appl. No.: 17/344,070

(22) Filed: Jun. 10, 2021

(65) Prior Publication Data

US 2021/0294609 A1  Sep. 23, 2021

Related U.S. Application Data

(63) Continuation of application No. PCT/JP2018/045538, filed on Dec. 11, 2018.

(51) Int. Cl.
*G06F 9/38* (2018.01)
*G06F 9/30* (2018.01)

(52) U.S. Cl.
CPC .......... *G06F 9/3851* (2013.01); *G06F 9/3009* (2013.01); *G06F 9/30079* (2013.01)

(58) Field of Classification Search
CPC ... G06F 9/30079; G06F 9/3009; G06F 9/3851
See application file for complete search history.

(56) References Cited

U.S. PATENT DOCUMENTS 5,907,702 A    5/1999   Flynn et al.
6,105,127 A    8/2000   Kimura et al.
(Continued)

FOREIGN PATENT DOCUMENTS

JP    H8-55033 A    2/1996
JP    H10-124316 A    5/1998
(Continued)

OTHER PUBLICATIONS

An the International Search Report of PCT/JP2018/045538 dated Mar. 19, 2019.

*Primary Examiner* — Courtney P Carmichael-Moody
(74) *Attorney, Agent, or Firm* — Metrolex IP Law Group, PLLC

(57) ABSTRACT

A pipeline processing unit includes a fetch unit that fetches the instruction for the thread having an execution right, a decoding unit that decodes the instruction fetched by the fetch unit, and a computation execution unit that executes the instruction decoded by the decoding unit. When the WAIT instruction for the thread having the execution right is executed, an instruction holding unit holds instruction fetch information on a processing target instruction to be processed immediately after the WAIT instruction. An execution target thread selection unit selects a thread to be executed based on a wait command and, in response to a wait state started from the execution of the WAIT instruction being canceled, processes the processing target instruction from decoding thereof based on the instruction fetch information on the processing target instruction held in the instruction holding unit.

10 Claims, 6 Drawing Sheets

(56) References Cited

U.S. PATENT DOCUMENTS

| | | | | |
|---|---|---|---|---|
| 6,493,741 | B1* | 12/2002 | Emer | G06F 9/3851 |
| | | | | 712/228 |
| 8,041,754 | B1* | 10/2011 | Marr | G06F 9/5011 |
| | | | | 712/228 |
| 2006/0179274 | A1* | 8/2006 | Jones | G06F 9/3802 |
| | | | | 712/E9.055 |
| 2010/0082867 | A1 | 4/2010 | Adachi et al. | |
| 2021/0397453 | A1* | 12/2021 | Al Sheikh | G06F 9/3867 |

FOREIGN PATENT DOCUMENTS

| JP | H10-283203 A | 10/1998 |
|---|---|---|
| JP | H11-249907 A | 9/1999 |
| JP | 2008-299740 A | 12/2008 |
| JP | 2010-86131 A | 4/2010 |

* cited by examiner

PROCESSOR AND PIPELINE PROCESSING METHOD FOR PROCESSING MULTIPLE THREADS INCLUDING WAIT INSTRUCTION PROCESSING

CROSS REFERENCE TO RELATED APPLICATIONS

This application is a continuation application of International Application No. PCT/JP2018/045538, filed on Dec. 11, 2018, the entire contents of which are incorporated herein by reference.

BACKGROUND

The disclosure relates to a processor and a pipeline processing method in which a WAIT instruction is executed when performing pipeline processing, or pipelining.

A processor performs pipeline processing in order to improve the processing speed. Pipeline processing is processing in which instructions are fetched, decoded, and computation is executed and in which fetching of a instruction B is started at the same time as decoding is started for a previously fetched instruction A.

That is, in pipeline processing, instructions are processed in parallel. The instructions may be stored in a instruction memory configured separately from the processor and associated with given addresses.

In pipeline processing, depending on the result of an executed instruction, the order and operation of the subsequent instructions may sometimes change. In the case of a change in subsequent instructions, it may become necessary to perform an operation of flushing the instructions being processed in the pipeline processing in a pipeline flush operation. One example of when a pipeline flush operation may become necessary is in a case of processing a WAIT instruction.

When a WAIT instruction is executed in the middle of pipelining, the pipelining temporarily stops any computation processing, performs a pipeline flush operation, and waits. Specifically, the instruction immediately following the WAIT instruction is not executed until the wait state expires or is externally canceled. Upon return (start) from the wait state, the processing of the following (next) instruction is started from a instruction fetch operation.

Conventional pipeline processing by a processor involving executing a WAIT instruction is described with reference to FIG. 8. In FIG. 8, FE denotes instruction fetch, DE denotes decoding, EX denotes instruction execution, and WB1 and WB2 each denote data write to a register.

For example, in a pipeline processing environment, when an instruction C1 starts being decoded after being fetched, a wait instruction WAIT starts being fetched at the same time. However, when decoding of the WAIT instruction WAIT begins, processing is suspended and instruction C3 is flushed from the pipeline. When the WAIT instruction expires, or is otherwise canceled, the instruction C3 may be re-fetched, decoded and executed.

Japanese Patent Application Publication No. 2008-299740 discloses a processor, which executes a WAIT instruction. The disclosed processor decodes the WAIT instruction and transitions to a wait state in which the processing in the processor is stopped or suspended, while the WAIT instruction is valid. In response to receiving a signal indicative of the end of the wait state, the processor exits the wait state and resumes executing the processing from a instruction indicated by a program counter.

SUMMARY

A processor is disclosed that performs pipeline processing of processing threads and execution and processing of instructions in parallel, which correspond to thread numbers of the threads and includes a WAIT instruction The processor according to one or more embodiments may include a pipeline processing unit that includes a fetch unit that fetches the instruction for the thread having an execution right, a decoding unit that decodes the instruction fetched by the fetch unit, and a computation execution unit that executes the instruction decoded by the decoding unit; a instruction holding unit that, when the WAIT instruction for the thread having the execution right is executed, holds instruction fetch information on a processing target instruction to be processed immediately after the WAIT instruction; and an execution target thread selection unit that selects a thread to be executed based on a wait command and, in response to a wait state started from the execution of the WAIT instruction being canceled, processes the processing target instruction from decoding thereof based on the instruction fetch information on the processing target instruction held in the instruction holding unit.

A pipeline processing method of processing threads and executing and processing instructions in parallel which correspond to thread numbers of the threads and include a WAIT instruction is disclosed. The method according to one or more embodiments may include performing pipeline processing including fetching the instruction for the thread having an execution right, decoding the fetched instruction, and executing the decoded instruction; when the WAIT instruction for the thread having the execution right is executed, holding, in an instruction holding unit, instruction fetch information on a processing target instruction to be processed immediately after the WAIT instruction; and selecting a thread to be executed based on a wait command and, when a wait state started from the execution of the WAIT instruction is canceled, processing the processing target instruction from decoding thereof based on the instruction fetch information on the processing target instruction held in the instruction holding unit.

DETAILED DESCRIPTION

Processors and pipeline processing methods according to one or more embodiments are described in detail below with reference to the drawings.

In pipeline processing, multiple instructions are processed in parallel. In one or more embodiments are described in which multi-threading in which instructions belonging to multiple threads are processed. However, various aspects in accordance with one or more embodiments disclosed herein, may also be applicable to techniques other than multi-threading.

Figure 1:
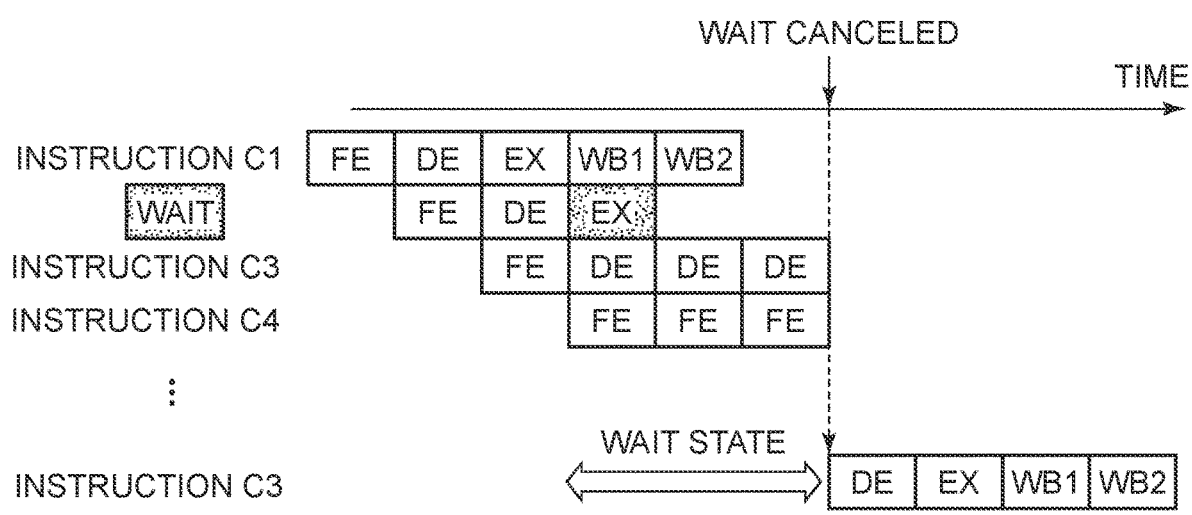
FIG. 1 is a diagram illustrating pipeline processing by a processor involving execution of a WAIT instruction by the processor according to one or more embodiments.

A general description of one or more embodiments is given using pipeline processing by a processor illustrated in FIG. 1, which involves execution of a WAIT instruction. The description is given also by comparing the pipeline processing illustrated in FIG. 8 and the pipeline processing illustrated in FIG. 1.

Figure 8:
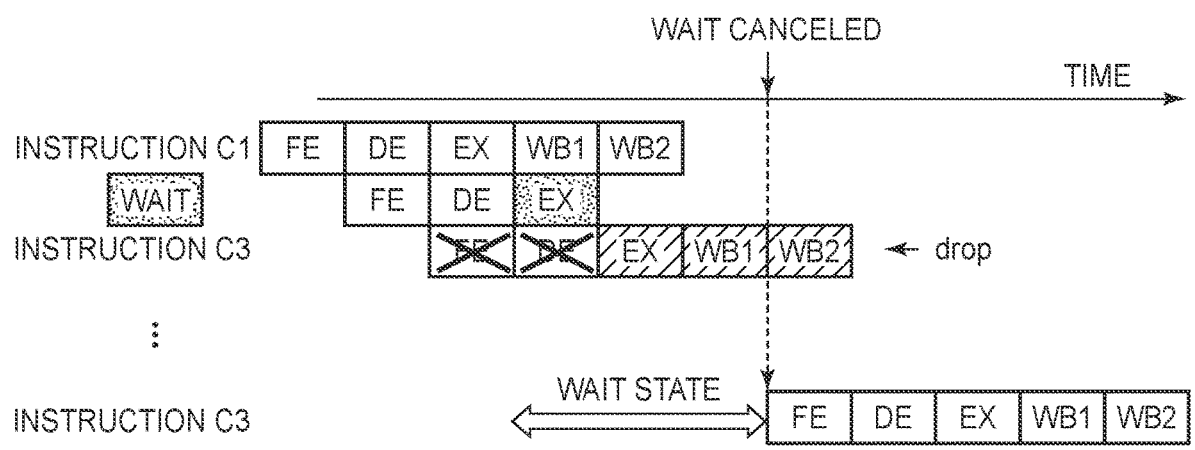
FIG. 8 is a diagram illustrating pipeline processing by a processor involving execution of a WAIT instruction according to related art.

In the pipeline processing illustrated in FIG. 8, the instruction C3 immediately following the WAIT instruction WAIT is flushed from the pipeline, and is re-fetched when the wait is canceled.

In one or more embodiments, as illustrated FIG. 1, the instruction C3 is not flushed from the pipeline, and instruction fetch information on the instruction C3 immediately following the WAIT instruction WAIT is held at the time of execution EX of the WAIT instruction.

When the wait state started from the execution EX of the WAIT instruction WAIT is canceled, the processing is executed from the decoding of the instruction C3 based on the held instruction fetch information on the instruction C3.

In accordance with one or more embodiments, it is possible to reduce a time loss and improve processing speed. It is also possible to achieve a quick start from the wait state.

Embodiment 1

Figure 2:
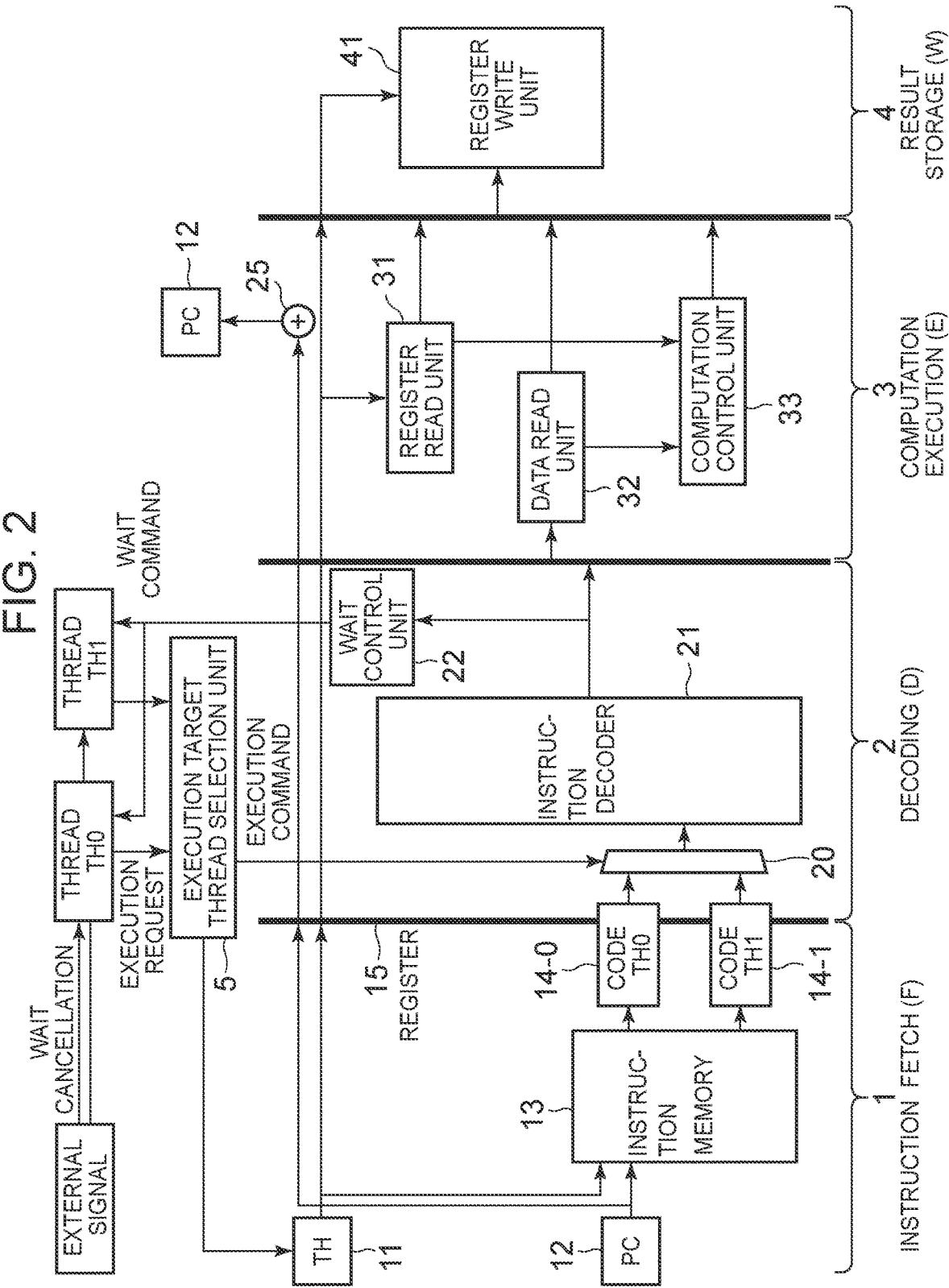
FIG. 2 is a diagram illustrating a pipeline configuration in a processor according to an embodiment 1.

A processor and a pipeline processing method according to one or more embodiments are described. FIG. 2 is a diagram illustrating a pipeline configuration in a processor according to Embodiment 1. The processor according to Embodiment 1 performs pipeline processing of processing threads and execution and processing instructions in parallel, which correspond to thread numbers of the threads and include a WAIT instruction. The pipeline processing includes instruction fetch (F) 1, decoding (D) 2, computation execution (E) 3, and result storage (W) 4. In examples of the processing, an instruction A may be fetched, and as the instruction A begins being decoded, an instruction B may begin to be fetched.

The instruction fetch (F) 1 includes a thread (TH) 11, a program counter (PC) 12, an instruction memory 13, and a register 15. The instruction fetch (F) 1 may correspond to a fetch unit. The register 15 is provided with instruction buffers 14-0 and 14-1 containing instruction codes of instructions executing in the threads TH0 and TH1, respectively. The number of instruction buffers 14-0 and 14-1 provided is the same as the number of threads TH0 and TH1, and they are provided in a one-to-one correspondence.

The decoding (D) 2 includes a selector 20, an instruction decoder 21, and a wait control unit 22. The decoding (D) 2 may correspond to a decoding unit. The computation execution (E) 3 includes a register read unit 31, a data read unit 32, and a computation control unit 33. The computation execution (E) 3 may correspond to a computation execution unit.

The threads TH0 and TH1 are associated with instruction addresses. In Embodiment 1, there are two threads but three or more threads may be provided.

In the instruction fetch (F) 1, the thread (TH) 11 is the thread number of a fetched instruction. The PC 12 represents an address in the instruction memory 13 at which a currently processed instruction is stored. The instruction memory 13 stores a series of instructions corresponding to the addresses in the PC 12 and belonging to threads (e.g., TH1).

The number of instruction buffers 14-0 and 14-1 provided is the same as the number of threads TH0 and TH1. When a WAIT instruction for a thread having an execution right (e.g. current execution priority) is executed, the corresponding one of the instruction buffers 14-0 and 14-1 holds instruction fetch information on the processing target instruction to be processed immediately after the WAIT instruction. The instruction buffers 14-0 and 14-1 may correspond to an instruction holding unit.

The selector 20 selects the instruction buffer 14-0 or 14-1 corresponding to a thread selected by an execution target thread selection unit 5.

The instruction decoder 21 decodes the instruction stored in the instruction buffer selected by the selector 20 and outputs the decoding result to the wait control unit 22. When the decoding result from the instruction decoder 21 is a WAIT instruction, the wait control unit 22 outputs a wait command to the thread corresponding to the WAIT instruction.

The thread to which the wait command is inputted outputs the wait command to the execution target thread selection unit 5. The execution target thread selection unit 5 selects a thread to be executed based on the wait command, and causes the instruction buffer 14-0 or 14-1 corresponding to the selected thread to hold the instruction fetch information on the processing target instruction to be processed immediately after the WAIT instruction.

In response to input of a cancellation event for canceling the wait state into the thread, the thread outputs a cancellation command to cancel the wait state to the execution target thread selection unit 5.

The execution target thread selection unit 5 controls the selector 20 such that the selector 20 reads out the instruction fetch information from the instruction buffer 14-0 or 14-1 corresponding to the selected thread and outputs the instruction fetch information to the instruction decoder 21.

Based on the instruction fetch information from the instruction buffer 14-0 or 14-1, the instruction decoder 21 executes processing starting from decoding of the processing target instruction.

The register read unit 31 reads out the register data with the thread number of the TH (11) stored in the register 15 and outputs it to a register write unit 41. The data read unit 32 reads out the data of the instruction decoded by the instruction decoder 21 and outputs it to the register write unit 41 and the computation control unit 33. The computation control unit 33 executes the decoded instruction read out by the data read unit 32 and outputs the execution result to the register write unit 41.

An addition unit 25 changes the value of the PC 12 stored in the register 15 and outputs the change result to the PC 12. The result storage (W) 4 includes the register write unit 41, which writes data to registers.

Figure 4:
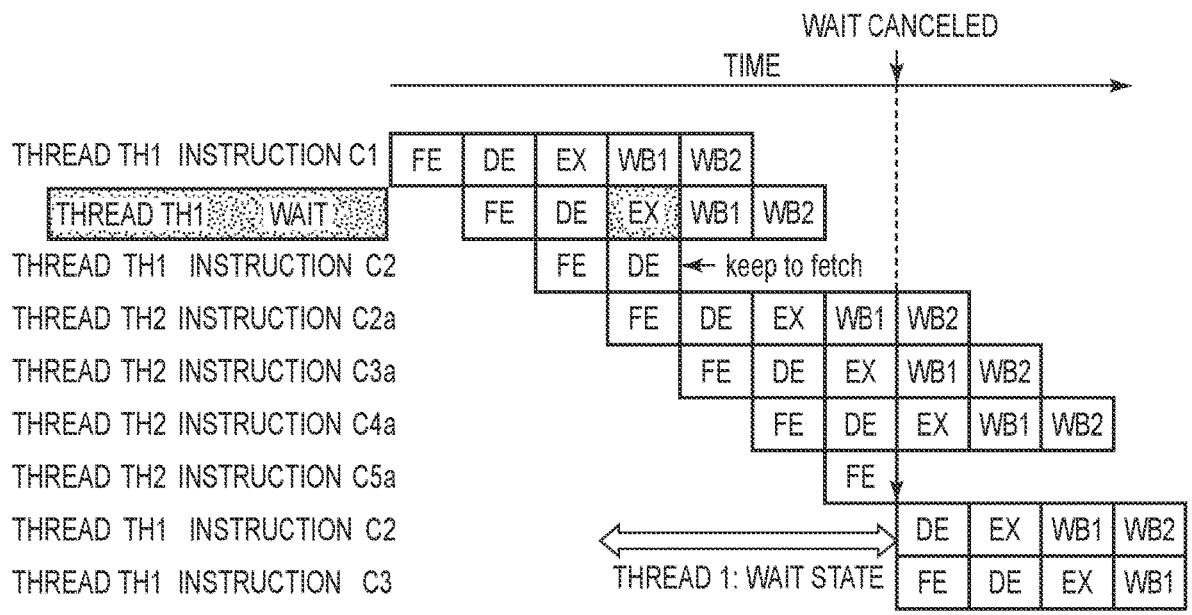
FIG. 4 is a diagram illustrating multi-threaded pipeline processing by a processor according to an embodiment 1.

Operation of the thus configured processor and in the pipeline processing method according to Embodiment 1 is described in detail with reference to FIG. 2 and FIG. 4. FIG. 2 illustrates a flow from the fetch of a WAIT instruction WAIT for a thread to the return from the wait state. FIG. 4 illustrates an example in which a WAIT instruction WAIT for the thread TH1 is fetched. While the description is given of a WAIT instruction WAIT for the thread TH1, a WAIT instruction WAIT for a thread TH2 is processed in the same way as the WAIT instruction WAIT for the thread TH1.

The instruction buffers 14-0 and 14-1 store the codes of instructions fetched from the instruction memory 13 for the respective threads. The execution target thread selection unit 5 determines the thread TH1 as one to be caused to execute a instruction and outputs an execution command to the thread 11 and the selector 20. Of the instruction buffers 14-0 and 14-1, the instruction buffer 14-1 is selected by the selector 20 in accordance with the execution command and the instruction code contained in the instruction buffer 14-1 is sent to the instruction decoder 21.

If the instruction decoder 21 determines that the instruction is a WAIT instruction, the wait control unit 22 sends a wait command to the thread TH1. The thread TH1 transitions to a wait state. Based on the wait command, the execution target thread selection unit 5 selects the thread TH1 and causes the instruction buffer 14-1, which corresponds to the thread TH1, to hold the instruction fetch information on an instruction C2 immediately following the WAIT instruction WAIT for the thread TH1. The instruction fetch information on the instruction C2 is held even during the wait state.

When the thread TH1 receives an external signal for canceling the wait, the thread TH1 outputs an execution request to the execution target thread selection unit 5. The execution target thread selection unit 5 outputs a command to execute the instruction C2 for the thread TH1 to an "instruction decoding" stage.

In response to the execution command, the instruction fetch information on the instruction C2 held in the instruction buffer 14-1 for the thread TH1, for which the wait has been canceled, is read out and sent to the instruction decoder 21 via the selector 20. The processing of the instruction C2 can now be resumed from the "instruction decoding" stage by the instruction decoder 21.

Re-fetch is therefore not needed, which can eliminate the time loss due to flushing the instruction from the pipeline and starting the processing again from the fetch operation. It is hence possible to reduce the time loss and improve the processing speed. It is also possible to achieve a quick start from the wait state.

Figure 3:
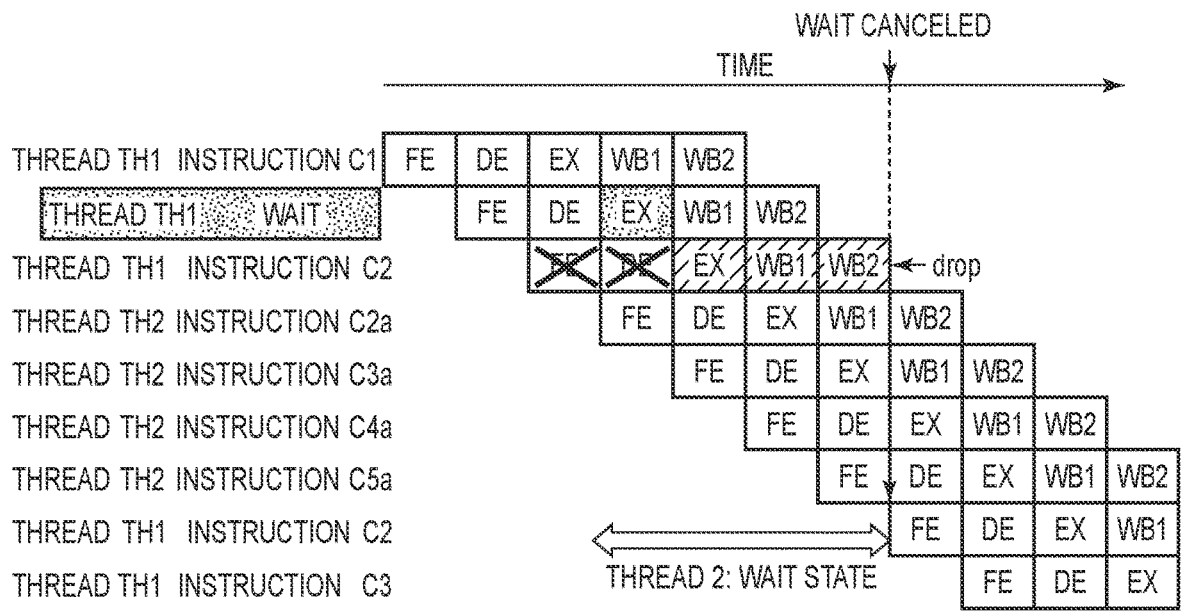
FIG. 3 is a diagram illustrating multi-threaded pipeline processing by a processor according to related art.

Conventional multi-threaded pipeline processing is described with reference to FIG. 3. The instruction C2 immediately following the WAIT instruction WAIT is discarded (illustrated by X). When the wait state is canceled, the processing of the instruction C2 is executed from the instruction fetch again, causing a time loss due to re-executing the fetch processing, having the effect of slowing down the processing speed.

Embodiment 2

Figure 5:
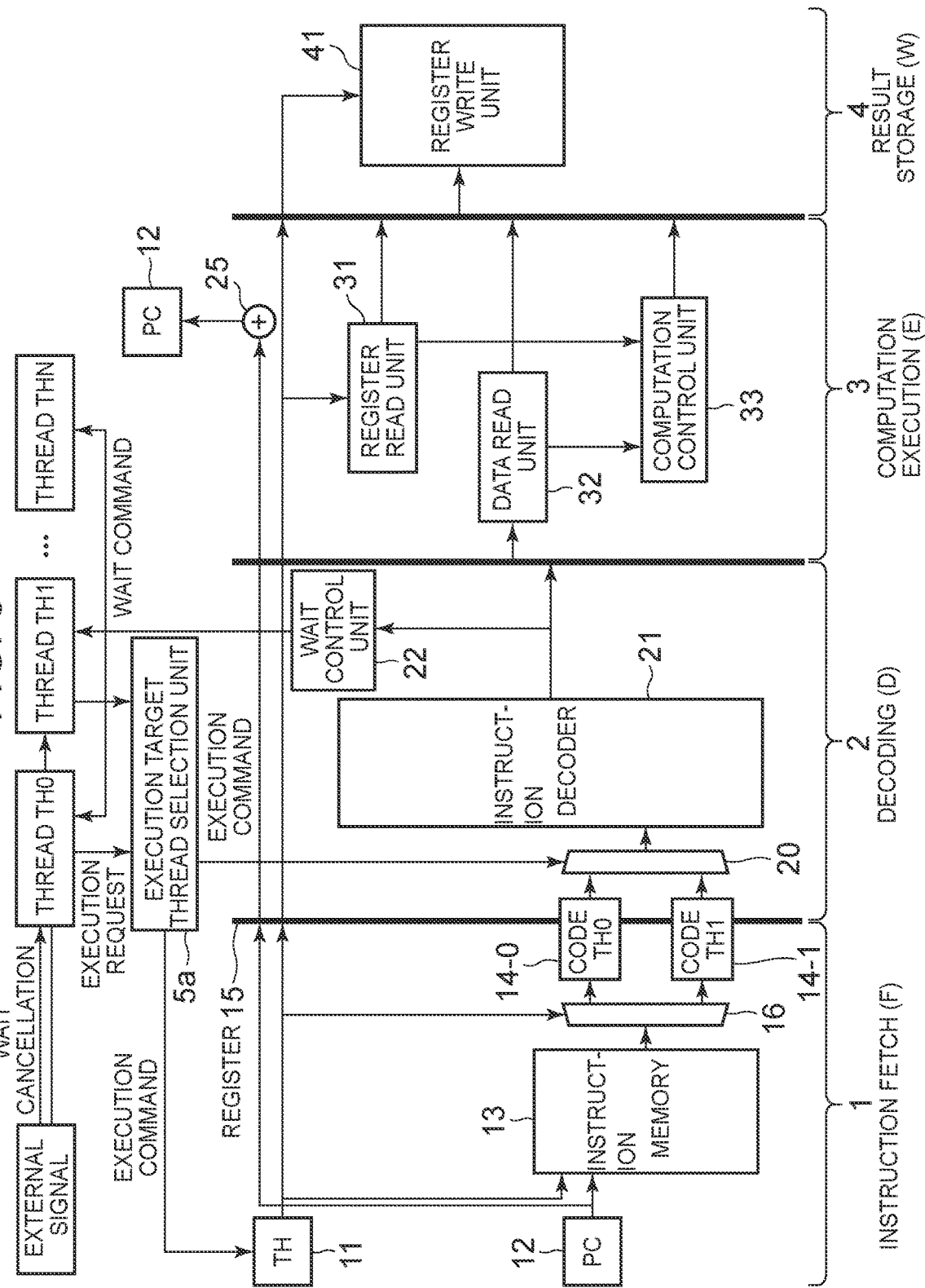
FIG. 5 is a diagram illustrating a pipeline configuration in a processor according to an embodiment 2.

FIG. 5 is a diagram illustrating a pipeline configuration in a processor according to Embodiment 2. In the processor according to Embodiment 2, the number of instruction buffers provided, i.e., two instruction buffers 14-0 and 14-1, is less than the number of threads TH0 to THN (N≥3). Also, instruction fetch 1 is provided with a selector 16.

The order of priority of the threads TH0 to THN is as follows: thread TH0>thread TH1> . . . >thread THN. The instruction buffers are assigned only to threads with high priorities. In Embodiment 2, the instruction buffers 14-0 and 14-1 are provided only for the threads TH0 and TH1.

When the thread with the execution right is the thread TH0, the selector 16 selects the instruction buffer 14-0 and holds the instruction fetch information on an instruction from the instruction memory 13 in the instruction buffer 14-0. When the thread with the execution right is the thread TH1, the selector 16 selects the instruction buffer 14-1 and holds the instruction fetch information on an instruction from the instruction memory 13 in the instruction buffer 14-1.

The instruction fetch information on the instruction in the instruction buffer 14-0 is read out when wait of the thread TH0 is canceled, while the instruction fetch information on the instruction in the instruction buffer 14-1 is read out when wait of the thread TH1 is canceled. The processing of the instruction can then be resumed from a "instruction decoding" stage by a instruction decoder 21.

When the wait state of the threads TH2 to THN other than the threads TH0 and TH1 is canceled, the instruction fetch is performed again.

Since the number of instruction buffers 14-0 and 14-1 provided is less than the number of threads TH0 to THN, it is possible to reduce an increase in hardware. The processor and the pipeline processing method according to Embodiment 2 can achieve advantageous effects similar to those by the processor and the pipeline processing method according to Embodiment 1.

Embodiment 3

Figure 6:
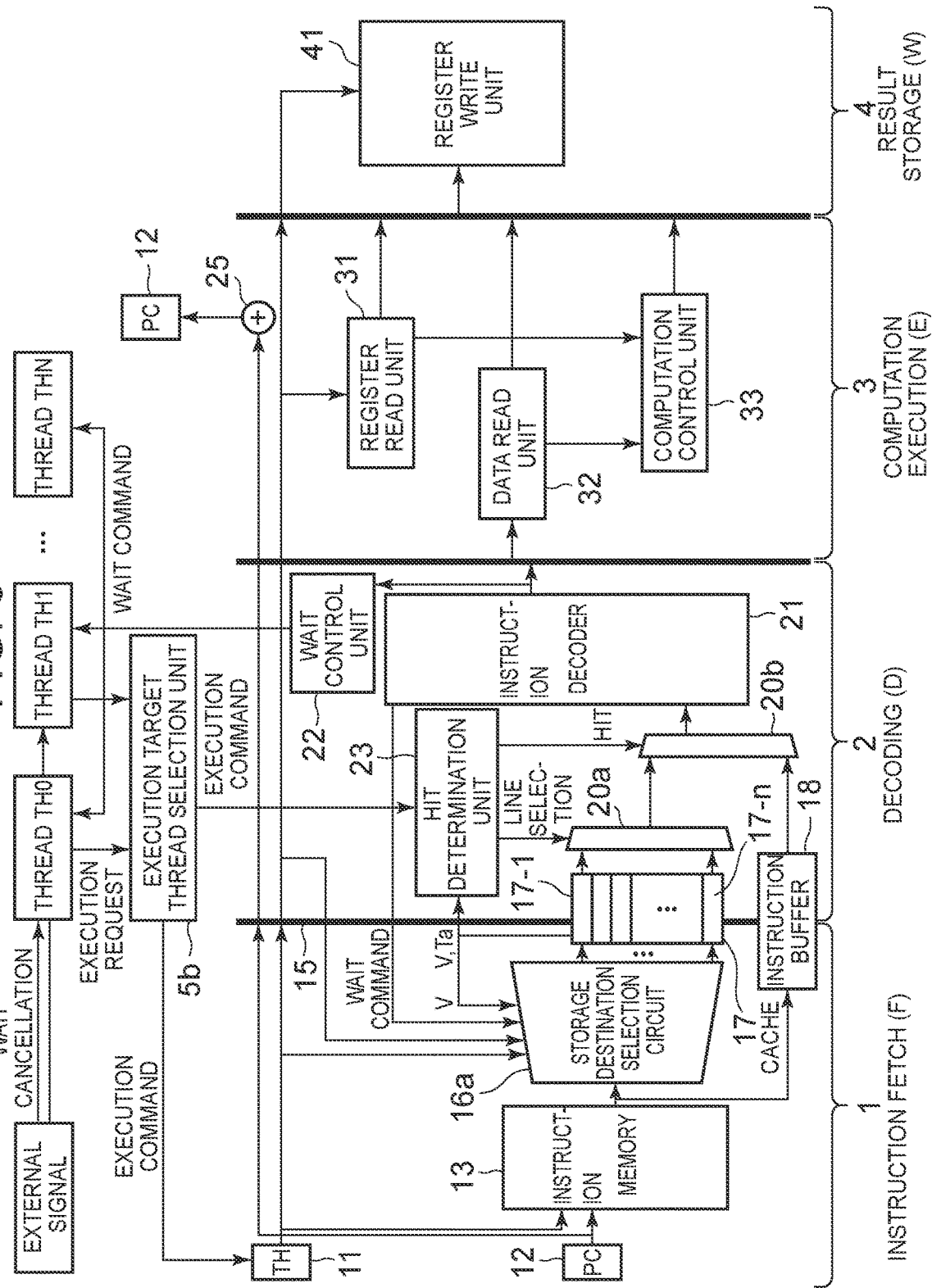
FIG. 6 is a diagram illustrating a pipeline configuration in a processor according to an embodiment 3.

FIG. 6 is a diagram illustrating a pipeline configuration in a processor according to Embodiment 3. In the processor according to Embodiment 3, the instruction buffers may be provided in a cache structure. The cache structure, if it is a direct-mapped structure, may correspond to Embodiment 2 described above. Processors according to one or more embodiments may only need to store the instruction fetched immediately after a WAIT instruction. Thus, processors according to one or more embodiments do not have to employ a set-associative scheme in which each set is associated with cache lines.

In one or more embodiments, it is suitable to employ a full-associative scheme in which, for every cache line, a check circuit is provided which checks whether the content of the tag and the address to be accessed match, and all cache lines are checked by the check circuits in parallel.

The processor according to Embodiment 3 includes a storage destination selection circuit 16a, a cache (cache memory) 17, an instruction buffer 18, selectors 20a and 20b, and a hit determination unit 23.

The cache 17 includes an array of cache lines 17-1 to 17-n, and stores only the instruction fetch information on the instruction immediately following a WAIT instruction. Only the instruction fetch information on the instruction immediately following a WAIT instruction may be stored in one of the cache lines 17-1 to 17-n, and previous instructions do not need to be stored in the cache lines 17-1 to 17-n. Accordingly, it is sufficient for the number of cache entries to be equal to or less than the number of threads.

Figure 7:
FIG. 7 is a diagram illustrating information in a cache line in a processor according to an embodiment 3.

As illustrated in FIG. 7, each of the cache lines 17-1 to 17-n has pieces of information being V, a tag, and data (and information indicating the caching order in some cases). V (Valid) indicates whether the instruction is valid or invalid. When the storage destination selection circuit 16a selects one of the cache lines 17-1 to 17-n and a instruction is written to the selected cache line, V in the cache line is made valid (V=1). V is made invalid (V=0) when the instruction is read out from the corresponding entry in response to cancellation of the WAIT instruction. The tag is information to be used in a data search (selection) for reading out the data. The thread number corresponding to the stored instruction is written in the tag. The instruction is the instruction fetched immediately after a WAIT instruction.

The storage destination selection circuit 16a determines whether to store the fetched instruction in the cache 17 and also determines in which cache line to store the instruction. The storage destination selection circuit 16a may correspond to a selection circuit. When a instruction decoded by the instruction decoder 21 is a WAIT instruction and the fetched instruction and the decoded instruction are present in the same thread, the storage destination selection circuit 16a selects a cache line from among the cache lines 17-1 to 17-n based on the valid V and writes the fetched instruction to the selected cache line.

When there is a cache line with V=0 among the cache lines 17-1 to 17-n, the storage destination selection circuit 16a writes the fetched instruction to this cache line. When there is no cache line with V=0, the storage destination selection circuit 16a gets rid of the oldest instruction and writes the fetched instruction to the cleared cache line. The cache 17 has information or a structure that enables determination on which instruction is the oldest. Forming the cache 17 in a first-in first-out (FIFO) structure makes it easy to determine the oldest instruction since the oldest instruction appears at the head of the FIFO.

When the decoded instruction is not a WAIT instruction, the fetched instruction is stored in the normal instruction buffer 18. This is to avoid contamination of the cache 17 by the instruction immediately following a WAIT instruction.

In response to receiving an execution command generated as a result of canceling wait from an execution target thread selection unit 5b, the hit determination unit 23 selects the instruction to be decoded right after the wait cancellation, based on the valid V and the tag in the each of the cache lines 17-1 to 17-n. The hit determination unit 23 may correspond to a determination unit.

When there is, among the cache lines 17-1 to 17-n, a cache line with a instruction that is valid (V=1) and a tag that matches the thread whose wait is to be canceled, the hit determination unit 23 outputs a selection signal for reading out the fetched instruction in this cache line to the selector 20a (first selector). The selector 20a reads out the fetched instruction in this cache line in accordance with the selection signal.

At the same time, the hit determination unit 23 outputs a hit signal for indicating that an instruction whose wait is to be canceled is present in the cache 17 to the selector 20b. Based on the hit signal, the selector 20b selects the cache 17. Specifically, when there is a hit in the cache 17, the selector 20b outputs the instruction from the corresponding one of the cache lines 17-1 to 17-n in the cache 17 to the instruction decoder 21.

When no hit signal is sent from the hit determination unit 23 to the selector 20b, that is, when there is not hit in the cache memory 17, the selector 20b selects the instruction buffer 18. Accordingly, the instruction is fetched again from the instruction memory 13, and the fetched instruction is stored in the instruction buffer 18 and then outputted to the instruction decoder 21.

Thus, the processor and the pipeline processing method according to Embodiment 3 can achieve advantageous effects similar to those by the processor and the pipeline processing method according to Embodiment 2. Employing the cache 17 also provides higher flexibility than in Embodiment 2.

As described above, in the pipeline processing illustrated in FIG. 8, when a WAIT instruction is executed, the processor stops the computation processing, waits, and starts the processing of the following instruction from the instruction fetch again upon return from the wait state. This causes a time loss and thus slows down the processing speed.

According to processors and pipeline processing methods according to one more embodiments, when a WAIT instruction for a thread having an execution right is executed, the instruction holding unit holds the instruction fetch information on the processing target instruction to be processed immediately after the WAIT instruction. Based on a wait command, the execution target thread selection unit selects the thread to be executed and, when the wait state started from the execution of the WAIT instruction is canceled, processes the processing target instruction from the decoding thereof based on the instruction fetch information on the processing target instruction held in the instruction holding unit. In this way, it is possible to reduce a time loss and improve the processing speed.

The invention claimed is:

1. A processor that performs pipeline processing of processing threads and executing and processing instructions in parallel which correspond to thread numbers of the threads and include a WAIT instruction, the processor comprising:
    a pipeline processing unit that comprises:
        a fetch unit that fetches an instruction for a respective thread of the threads having an execution right,
        a decoding unit that decodes the instruction fetched by the fetch unit, and
        a computation execution unit that executes the instruction decoded by the decoding unit;
    an instruction holding unit that, when the WAIT instruction for the respective thread having the execution right is executed, holds instruction fetch information on a processing target instruction to be processed immediately after the WAIT instruction such that re-fetching of the processing target instruction is not performed after the WAIT instruction; and
    an execution target thread selection unit that selects a thread to be executed based on a wait command and, in response to a wait state started from the execution of the WAIT instruction being canceled, causes the instruction fetch information to be read out from the instruction holding unit such that the processing target instruction is fetched and decoded based on the instruction fetch information and the processing target instruction held in the instruction holding unit is processed.

2. The processor according to claim 1, wherein a same number of instruction holding units as a number of the threads are provided.

3. The processor according to claim 2, further comprising a wait control unit that, when a result of the decoding by the decoding unit is the WAIT instruction, outputs the wait command to the thread corresponding to the WAIT instruction, wherein
    the execution target thread selection unit selects the thread to be executed based on the wait command from the wait control unit, causes the instruction holding unit corresponding to the selected thread to hold the instruction fetch information on the processing target instruction, and, in response to input of a command to cancel the wait state of the selected thread, causes the instruction fetch information to be read out from the instruction holding unit such that the processing target instruction is fetched and decoded based on the instruction fetch information and the processing target instruction held in the instruction holding unit corresponding to the selected thread is processed.

4. The processor according to claim 1, wherein
a number of instruction holding units is smaller than a number of the threads, and
the instruction holding units are assigned only to the threads with high priorities among the threads.

5. The processor according to claim 1, wherein
the instruction holding unit includes a cache with cache lines each storing pieces of information comprising a valid bit indicating whether the processing target instruction is valid or invalid, a tag indicating a thread number corresponding to the processing target instruction, and the fetched processing target instruction, and
the processor further comprises:
 a selection circuit that, when an instruction decoded by the decoding unit is the WAIT instruction, and the fetched processing target instruction and the decoded processing target instruction are present in a same thread, selects a cache line among the cache lines based on the valid bit and writes the fetched processing target instruction to the selected cache line; and
 a determination unit that, in response to receiving a command to execute a thread whose wait is to be canceled from the execution target thread selection unit, outputs a signal to the selection circuit to: read out the fetched processing target instruction from the selected cache line based on the valid bit; and output the fetched processing target instruction to the decoding unit when the tag matches the thread whose wait is to be canceled.

6. A pipeline processing method of processing threads and executing and processing instructions in parallel which correspond to thread numbers of the threads and include a WAIT instruction, the method comprising:
 performing pipeline processing including
  fetching an instruction for a respective thread of the threads having an execution right,
  decoding the fetched instruction, and
  executing the decoded instruction;
 in response to the WAIT instruction for the respective thread of the threads having the execution right being executed, holding, in an instruction holding unit, instruction fetch information on a processing target instruction to be processed immediately after the WAIT instruction such that re-fetching of the processing target instruction is not performed after the WAIT instruction; and
 selecting a thread to be executed based on a wait command and, in response to a wait state started from the execution of the WAIT instruction being canceled, causing the instruction fetch information to be read out from the instruction holding unit such that the processing target instruction is fetched and decoded based on the instruction fetch information and the processing target instruction held in the instruction holding unit is processed.

7. The method according to claim 6, wherein a same number of instruction holding units as a number of the threads are provided.

8. The method according to claim 7, further comprising, in response to a result of the decoding being the WAIT instruction, outputting the wait command to the thread corresponding to the WAIT instruction, wherein
 the operation of the selecting the thread selects the thread based on the wait command, causes the instruction holding unit corresponding to the selected thread to hold the instruction fetch information on the processing target instruction, and, in response to input of a command to cancel the wait state of the selected thread, causes the instruction fetch information to be read out from the instruction holding unit such that the processing target instruction is fetched and decoded based on the instruction fetch information and the processing target instruction held in the instruction holding unit corresponding to the selected thread is processed.

9. The method according to claim 6, wherein
a number of instruction holding units is smaller than a number of the threads, and
the instruction holding units are assigned only to the threads with high priorities among the threads.

10. The method according to claim 6, wherein
the instruction holding unit includes a cache with cache lines each storing pieces of information comprising a valid bit indicating whether the processing target instruction is valid or invalid, a tag indicating a thread number corresponding to the processing target instruction, and the fetched processing target instruction, and
the method further comprises:
 in response to the decoded instruction being the WAIT instruction, and the fetched processing target instruction and the decoded processing target instruction are present in a same thread, selecting a cache line among the cache lines based on the valid bit and writing the fetched processing target instruction to the selected cache line; and
 in response to receiving a command to execute a thread whose wait is to be canceled from the operation of selecting a thread, reading out the fetched processing target instruction from the selected cache line based on the valid bit and outputting the fetched processing target instruction for decoding in response to the tag matching the thread whose wait is to be canceled.

* * * * *